(12) United States Patent
Kogure et al.

(10) Patent No.: US 6,744,355 B2
(45) Date of Patent: Jun. 1, 2004

(54) SYSTEM FOR NOTIFYING PERSON OF LEVEL OF DANGER OF OCCURRENCE OF TIRE FAILURE

(75) Inventors: Tomohiko Kogure, Kanagawa (JP); Yukio Tozawa, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 10/176,048

(22) Filed: Jun. 21, 2002

(65) Prior Publication Data

US 2002/0196138 A1 Dec. 26, 2002

(30) Foreign Application Priority Data

Jun. 26, 2001 (JP) ........................................ 2001-192672

(51) Int. Cl.⁷ .............................................. B60C 23/02
(52) U.S. Cl. ....................... 340/442; 340/444; 73/146.5
(58) Field of Search ................................ 340/442, 444, 340/447, 446, 448, 445; 73/146.4, 146.5

(56) References Cited

U.S. PATENT DOCUMENTS

| | | |
|---|---|---|
| 4,020,456 A | 4/1977 | Nozi ............................ 340/58 |
| 4,267,546 A | 5/1981 | Matsuda et al. ............... 340/58 |
| 4,529,961 A | 7/1985 | Nishimura et al. ............ 340/58 |
| 5,325,901 A | 7/1994 | Olney et al. .................. 152/418 |
| 5,583,483 A | * 12/1996 | Baumann ...................... 340/444 |
| 5,754,102 A | * 5/1998 | Yanase ......................... 340/442 |
| 5,945,908 A | * 8/1999 | Nowicki et al. ............. 340/447 |

* cited by examiner

*Primary Examiner*—Nina Tong
(74) *Attorney, Agent, or Firm*—Rader, Fishman & Grauer PLLC

(57) ABSTRACT

A system for notifying a driver in a vehicle of a level of danger of an occurrence of tire failure according to the present invention has a danger level assessment device which calculates a danger level assessment value indicating an index showing a probability of the occurrence of the failure from a measured tire inflation pressure and a measured tire running speed, using a characterized danger level assessing function to assess the danger level according to the calculated value. The characterized assessing function is a function of a tire running speed and of a tire inflation pressure, in which a value of the function monotonously increases as the tire running speed increase and as the tire inflation pressure decreases. The danger level assessment value is obtained by adding a cumulative value determined according to usage history of the tire to a value calculated from the danger level assessing function with the measured tire running speed and the measured tire inflation pressure.

11 Claims, 4 Drawing Sheets

DANGER LEVEL ASSESSING FUNCTION F

SYSTEM FOR NOTIFYING PERSON OF LEVEL OF DANGER OF OCCURRENCE OF TIRE FAILURE

BACKGROUND OF THE INVENTION

1. Field of the Invention

The present invention relates to a system for notifying a person of a level of danger of an occurrence of tire failure, which assesses and notifies a driver of a level of danger of an occurrence of failure of a tire mounted to an automobile or other such vehicle.

2. Description of the Related Art

Today, as vehicles become faster, a tire mounted to a vehicle needs to function at high speed with safety. Thus, there have been great improvements made in the durability of mounted tires, and particularly in the durability while running at high speed. Accordingly, at present, there is almost no problem of failing, bursting or the like of the mounted tire when it runs normally.

However, in cases where the mounted tire is used when tire inflation pressure has dropped drastically, or where the vehicle runs for a long time at an extremely high speed, or where a heavy load is provided to the mounted tire, there is an increased probability of the tire tread members breaking away from the tire main body, or of an end portion of a tire belt layer that is comprised of a steel belt separating from the tire main body. In other words, there is an increase in the level of danger of an occurrence of failure of the mounted tire. Further, when such conditions continue, there is an increase in the danger of the mounted tire finally failing and bursting.

Thus, a variety of proposals have been made for an air pressure warning system which constantly manages the tire inflation pressure, and notifies the driver of the drop in the tire inflation pressure when the air pressure of the tire becomes below a given level.

The above-mentioned air pressure warning system constantly monitors the tire inflation pressure, and the system is effective for a case where the tire inflation pressure drops extremely due to a certain cause, or for a case where the tire is punctured and the tire inflation pressure drops gradually, for example. However, in a case where the tire is used under a condition in which tire usage conditions are complicatedly overlapped, such as a case where the tire inflation pressure is relatively low and a relatively heavy load is provided to the mounted tire as the vehicle runs for a relatively long duration of time at high speed, simple constant monitoring of the tire inflation pressure does not work to predict and to notify the driver that the danger level of the mounted tire failure has become great before the failure occurs. Once the failure has occurred, even if the air pressure warning system provides a warning based on the drop in the tire inflation pressure, there is a fear that the vehicle will lose control of its movement and will crash.

SUMMARY OF THE INVENTION

The present invention has been made in view of solving the above-mentioned problems in the conventional art, and an object of the present invention is therefore to provide a system for notifying a person of a level of danger of an occurrence of tire failure, capable of notifying and also warning the driver of a high level of the danger of the occurrence of the tire failure before the tire failure occurs, even in a case where a tire that is mounted to an automobile or other such vehicle is used under a variety of overlapped conditions.

The invention provides a system for assessing a level of danger of an occurrence of failure of a mounted tire to a vehicle, and notifying a person of the level of the danger according to a result of the assessment, the system comprising: a tire inflation pressure measuring device for monitoring a tire inflation pressure of the mounted tire; a tire running speed measuring device for monitoring a tire running speed of the mounted tire; a danger level assessment device for, at least in a case where the tire running speed obtained by the monitoring is higher than a given reference speed, calculating a danger level assessment value indicating an index showing a probability of the occurrence of the failure of the mounted tire from the tire inflation pressure obtained by the monitoring by the tire inflation pressure measuring device and from the tire running speed obtained by the monitoring by the tire running speed measuring device, based on a danger level assessing function, and assessing the danger level of the occurrence of the tire failure of the mounted tire from the danger level assessment value; and a notification device for notifying a person of the danger level of the occurrence of the failure of the mounted tire, according to a result of the assessment of the danger level, wherein the danger level assessing function is a function of the tire running speed and of the tire inflation pressure, in which, at least when the tire running speed is in a speed range above the given reference speed, a value of the function monotonously increases as the tire running speed increases, and the value of the function increases as the tire inflation pressure decreases.

It is preferable that the danger level assessing function has a first linear function defined in a speed range equal to or below the reference speed in which a value of the function remains fixed regardless of increase in the tire running speed, or increases linearly with the tire running speed, and a second linear function defined in a speed range above the reference speed in which a value of the function increases linearly with the tire running speed; and wherein the first linear function and the second linear function connect at the reference speed and a gradient of the second linear function with respect to the tire running speed is greater than a gradient of the first linear function with respect to the tire running speed.

More preferably, the gradient of the first linear function and the gradient of the second linear function are determined by the tire inflation pressure.

Still more preferably, the gradient of the first linear function is equal to or above 0, and is equal to or less than 0.02 times a calculated value produced from the first linear function at a tire running speed 0 under a condition of a tire inflation pressure to be set of the mounted tire; and the gradient of the second linear function is greater than 0.02 times, and equal to or less than 1.0 times, the calculated value produced from the first linear function at the tire running speed 0 under the condition.

It is also preferable that the danger level assessment device adds a cumulative value determined according to a usage history of the mounted tire to a calculated value produced from the danger level assessing function, whereby the danger level assessment value is calculated.

More preferably, the danger level assessment device multiplies a duration of time for which the mounted tire is used by a function assessment reference value calculated value from the danger level assessing function at a tire running speed that is produced by multiplying the reference speed by the given value greater than 1, whereby the cumulative value is obtained.

Alternatively, the danger level assessment device preferably multiplies a sum of calculated values in a past for the mounted tire from the danger level assessing function by a function assessment reference value calculated from the danger level assessing function at a tire running speed that is produced by multiplying the reference speed by the given value greater than 1, whereby the cumulative value is obtained.

Alternatively the danger level assessment device more preferably calculates a weighted average between: a value produced by multiplying a product of a duration of time for which the mounted tire is used and a function assessment reference value calculated from the danger level assessing function at a tire running speed that is produced by multiplying the reference speed by a given value greater than 1, by a given number of times; and a value produced by multiplying a product of a sum of calculated values in a past for the mounted tire from the danger level assessing function and the function assessment reference value by a given number of times, whereby the cumulative value is obtained.

It is also preferable that the danger level assessing function with respect to the tire running speed when the tire inflation pressure is at a fixed level is a function obtained by approximating a characteristic function of a rolling resistance value that indicates a dependency of the mounted tire's rolling resistance on the tire running speed using two straight-line or curved-line functions which are connected to each other at the reference speed, and multiplying each of these straight-line or curved-line functions by a given coefficient; and a value of the coefficient used in the speed range above the reference speed is a value equivalent to or greater than a value of the coefficient used in the speed range that is equal to or below the reference speed.

It is still also preferable that sensitivity coefficients which indicate gradients of the danger level assessing function with respect to the tire running speed, and which include a first sensitivity coefficient for the speed range equal to or below the reference speed and a second sensitivity coefficient for the speed range above the reference speed, decrease linearly as the tire inflation pressure increases.

The system, preferably further comprises a load measuring device for monitoring a tire load while the vehicle runs, wherein the danger level assessment device calculates a tire load ratio based on a load obtained from the load measuring device by the monitoring, and adjusts a calculated value produced from the danger level assessing function based on the tire load ratio.

DETAILED DESCRIPTION OF THE PREFERRED EMBODIMENT

Hereinafter, a system for notifying a person of a level of danger of an occurrence of tire failure according to the present invention will be explained based on a preferred embodiment.

Figure 1:
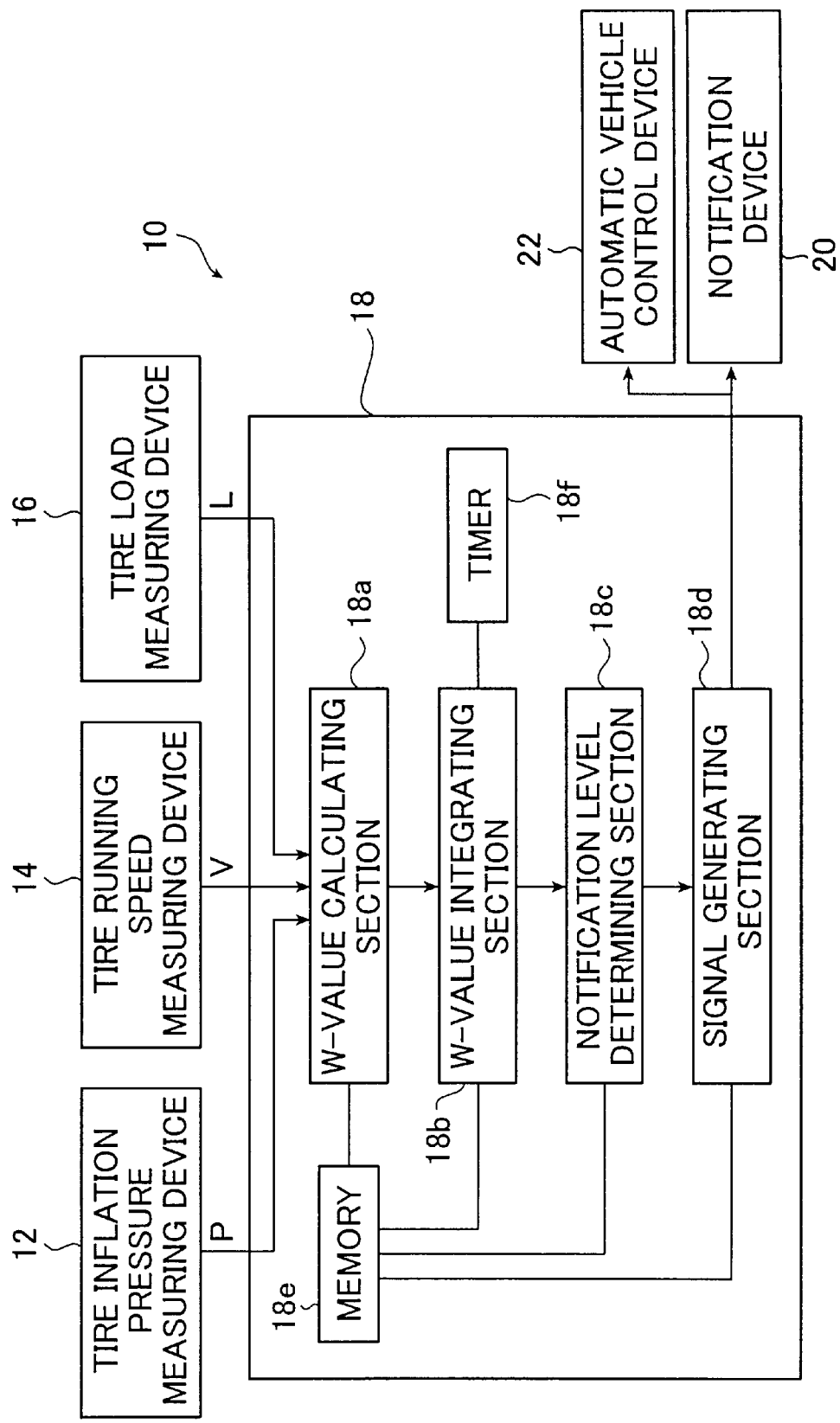
FIG. 1 is a block diagram showing a configuration of a system for notifying a level of danger of an occurrence of tire failure which is one example of the present invention.

FIG. 1 is a block diagram showing an outline of a system for notifying a person of a level of danger of an occurrence of tire failure (hereinafter referred to as "the system") 10, which is an embodiment of the present invention.

The system 10 is a notification system incorporated into a vehicle to which four tires are mounted, and the system 10 is configured by including mainly a tire inflation pressure measuring device 12, a tire running speed measuring device 14, a tire load measuring device 16, a danger level assessment device 18, a notification device 20 and an automatic vehicle control device 22.

The tire inflation pressure measuring device 12 is a device for monitoring the air pressure of the tire mounted to the vehicle at each wheel. A known device is used for this. For example, an air pressure measuring device may be used in which a rim that the tire is incorporated into is provided with an opening which connects to a tire cavity portion filled with air at a given internal pressure, and a pressure gauge is arranged so as to seal the opening which has been bored through the rim for measuring the internal air pressure of the tire. Alternatively, a wireless transmitting/receiving system may be used in which a radio transmitter and a pressure sensor are integrated in a transmitter with a pressure gauge which is attached to an inner peripheral surface of the tire's cavity portion, and then the internal air pressure of the tire is measured and a receiver which is provided to the main body of the vehicle receives information of the internal air pressure which has been measured and transmitted.

In the above-mentioned tire inflation pressure measuring device 12, the tire inflation pressure at each wheel is monitored at given time intervals of, for example, 1 time every few minutes, and this is sent to the danger level assessment device 18. Note that a tire inflation pressure (air pressure) P represents the tire inflation pressure at each wheel.

The tire running speed measuring device 14 is a device for measuring and monitoring a running speed of the mounted tire at each wheel. Assuming that, for example, a rolling radius of the tire is already known, the rotating speed of the mounted tire which is measured is multiplied by the rolling radius to calculate the tire running speed. A tire running speed measuring device used for an ABS (Anti-skid Braking System) can also serve as the tire running speed measuring device 14.

In the tire running speed measuring device 14, the tire running speed at each wheel is sampled at regular time intervals of, for example, approximately 1 time per 0.5 seconds, and an average tire running speed for, for example, 10 seconds is obtained and sent to the danger level assessment device 18. Note that a tire running speed V represents the tire running speeds at each wheel.

The tire load measuring device 16 is a device for measuring and monitoring a load provided to the mounted tire at each wheel. For example, a load cell is fixed to an upper mount portion of a coil spring of the mounted tire's suspension, and the load provided to the mounted tire is measured.

In the above-mentioned tire load measuring device 16, the tire load at each wheel is sampled at given time intervals of, for example, approximately 1 time per 0.5 seconds, an average tire load for, for example, 10 seconds is obtained and is sent to the danger level assessment device 18. Note that a tire load L represents the tire load at each wheel.

The notification device 20 connected to the danger level assessment device 18 is a device which notifies a driver of a level of the danger of the occurrence of the tire failure, according to results of an assessment of the level of the danger of the tire failure occurring, which is assessed by the danger level assessment device 18 as will be described below. The device 20 may be a voice output device for alerting a driver with a sound based on a notification level signal sent from the danger level assessment device 18, or a visual device using a display or the like furnished in the vehicle with the mounted tire, to alert visually the level of the danger to the driver. Alternatively, the steering wheel steered by the driver may be subtly vibrated to alert the driver perceptually.

The automatic vehicle control device 22 connected to the danger level assessment device 18 is a device for automatically controlling the running speed of the running vehicle according to the results of the assessment of the level of the danger of the tire failure occurring, which is assessed by the danger level assessment device 18.

The danger level assessment device 18 is a device for calculating a danger level assessment value representing an index indicating a probability of the occurrence of the failure of the mounted tire based on the tire inflation pressure P obtained by the tire inflation pressure measuring device 12, the tire running speed V obtained by the tire running speed measuring device 14 and the tire load L obtained by the tire load measuring device 16, and assessing the level of danger of the tire failure occurring.

The danger level assessment device 18 mainly includes a W-value calculating section 18a, a W-value integrating section 18b, a notification level determining section 18c and a signal generating section 18d, and also includes a memory 18e and a timer 18d.

The W-value calculating section 18a is a section which calls up information of a danger level assessing function F stored in the memory 18e in advance, defines the danger level assessing function F, and calculates a function assessment value $W_0$ based on the danger level assessing function F and the air pressure P, the tire running speed V and the tire load L obtained from the monitoring.

Figure 2:
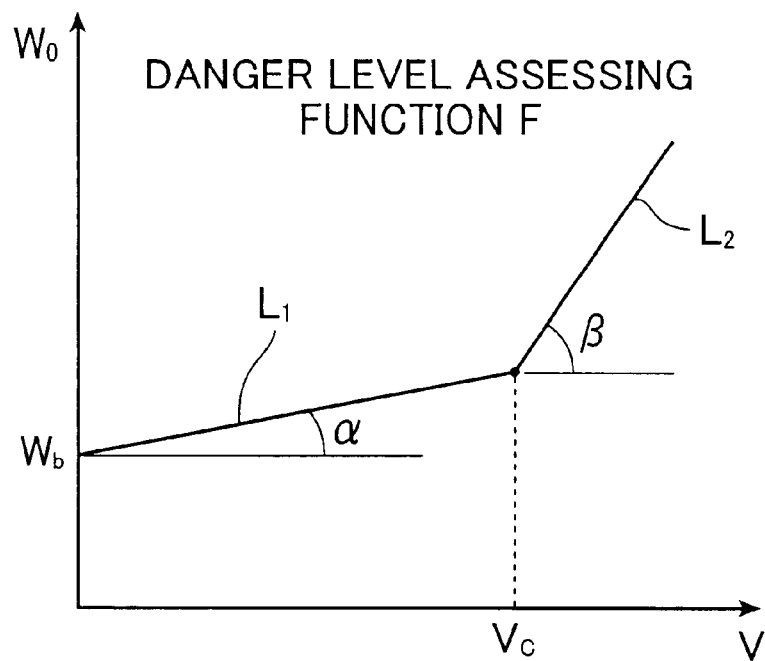
FIG. 2 is diagram for explaining a tire running speed dependency of a danger level assessing function used in the system according to the present invention.

As shown in FIG. 2, when the air pressure P is constant and the tire running speed V is expressed as a horizontal axis and the function assessment value $W_0$ is expressed as a vertical axis, the danger level assessing function F is constituted by a linear function $L_1$ and a linear function $L_2$, where the linear function $L_1$ and the linear function $L_2$ are connected at a reference speed $V_c$. Further, the linear function $L_1$ exhibits a value of $W_b$ when the tire running speed V=0. At the same time, as the tire running speed V rises, the function assessment value $W_0$ increases linearly. Further, the linear function $L_2$ is connected to the linear function $L_1$ where the tire running speed V=$V_c$, and as the tire running speed V rises, the function assessment value $W_0$ increases linearly. Further, a sensitivity coefficient which is a gradient of the linear function $L_2$ with respect to the tire running speed is greater than a sensitivity coefficient which is a gradient of the linear function $L_1$ with respect to the tire running speed, and the sensitivity coefficient of the linear function $L_1$ and the sensitivity coefficient of the linear function $L_2$ are functions of the tire inflation pressure, respectively. Furthermore, they increase linearly as the tire inflation pressure decreases during the sensitivity coefficient of the linear function $L_2$ continuously remaining a greater value than the sensitivity coefficient of the linear function $L_1$. Alternatively, the sensitivity coefficients decrease linearly as the tire inflation pressure increases.

Note that, in the present embodiment, taking the reference speed $V_c$ as a boundary, functions which are divided as being above or below the reference speed $V_c$ are expressed respectively as the linear functions. However, the present invention is not restricted to this configuration. Non-linear functions expressed as curves may be used instead of the linear functions. At least in a state where the tire running speed is faster than the reference speed $V_c$, it is sufficient if the function is one in which the function assessment value $W_0$ monotonously rises as the tire running speed V increases and rises as the air pressure P decreases.

It is preferable that the above-mentioned sensitivity coefficient ($\alpha$) and the sensitivity coefficient ($\beta$) of the linear functions $L_1$ and $L_2$ exhibit the following values with respect to the value $W_b$ when the tire running speed V=0 in a state of an air pressure $P_0$ to be set of the mounted tire of the vehicle. Here, the air pressure to be set is an internal tire pressure which is instructed as a standard internal tire pressure of each vehicle, and the air pressure to be set is instructed on a label attached to a door of the main body of the vehicle and also instructed in a manual for use for the vehicle.

$\alpha(P_0)$=0 to 0.02×$W_b$ (1/(km/hour))

$\beta(P_0)$=0.02×$W_b$ to 1.0×$W_b$ (1/(km/hour))

Figure 3:
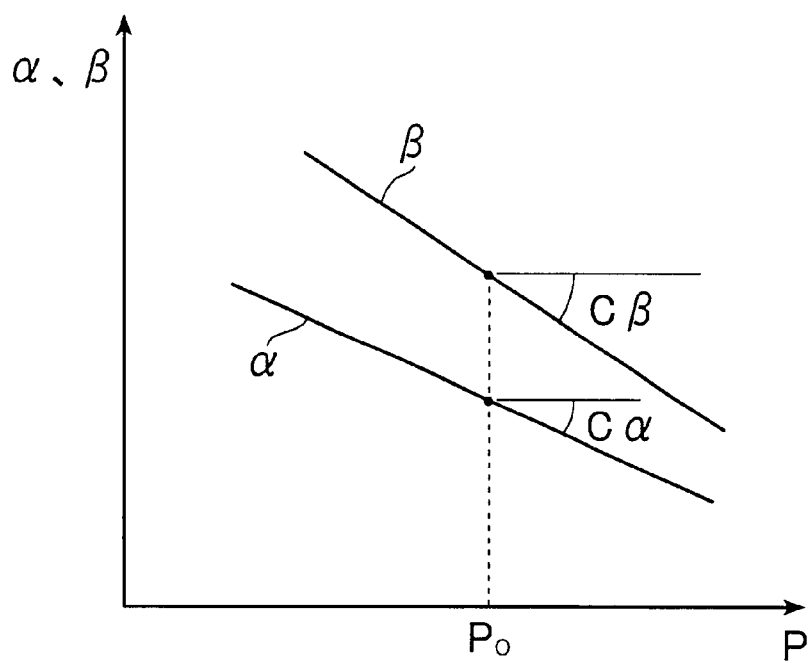
FIG. 3 is diagram for explaining a tire inflation pressure dependency of a danger level assessing function used in the system according to the present invention.

Further, as shown in FIG. 3, the dependency of the sensitivity coefficients $\alpha$ and $\beta$ on the tire inflation pressure is indicated by a linear function which is linearly proportionate to the tire inflation pressure. It is preferable that gradients C$\alpha$ and C$\beta$ of both of these exhibit values within a range of −0.002 to −0.5 (/kPa).

Note that the value of $W_b$ is standardized and set in advance, or is set based on a setting value of the danger level assessment values $W_1$ to $W_n$ described below.

As described above, the danger level assessing function F can be expressed using the linear functions $L_1$ and $L_2$ because the present inventors discovered the following points.

Namely, the present inventors discovered the following: the failure occurs in the vehicle's mounted tires in such way that a tire tread member breaks away from the main body of the tire, or an end portion of the tire belt member breaks away from the main body of the tire, and the like. Each failure is equivalent to or are extremely similar to a failure which finally occurs in the tire in an indoor test in which the tire is run on an indoor drum with the tire running speed gradually increased at fixed time intervals and the tire's rolling resistance is measured. When the indoor test is being performed, the danger level of the failure occurring in the mounted tire can be estimated using the assessment function which exhibits the same tendency as a characteristic function of the rolling resistance that is being measured.

Explaining a detail behavior of a portion of the running tire along a circumferential direction, a periodical distortion is generally found where the portion of a tire member becomes distorted due to a tire deformation when the portion rotates at a ground-contact side of the lower side of the tire, then the portion of the tire member becomes restored when the portion rotates away from the ground-contact side. At that time, part of the distortion energy of the tire is converted into heat which is accumulated in the member of the tire, for example, the tire tread member or the tire belt member, thus causing heat deterioration of material properties of the member of the tire, or deterioration of the adhesiveness between members of the tire, thereby becoming a cause of the tire failure. In particular, when tire rotating speed increases, centrifugal force generated by the high speed rotation of the tire causes the tire's outer circumference to expand outwardly, thereby increasing the degree of the distortion due to the deformation on the ground-contact side. Therefore, the faster the rotating speed of the tire, the greater the generation of the heat and the greater the distortion, which can cause the tire failure to occur more easily. The rolling resistance which is being measured while the tire rotates/runs as described above indicates a degree to which the part of the distortion energy of the rolling tire is converted into heat and becomes a resistance. Therefore, the rolling resistance can be used as an index to indicate the danger level of the tire failure occurring.

Figure 4:
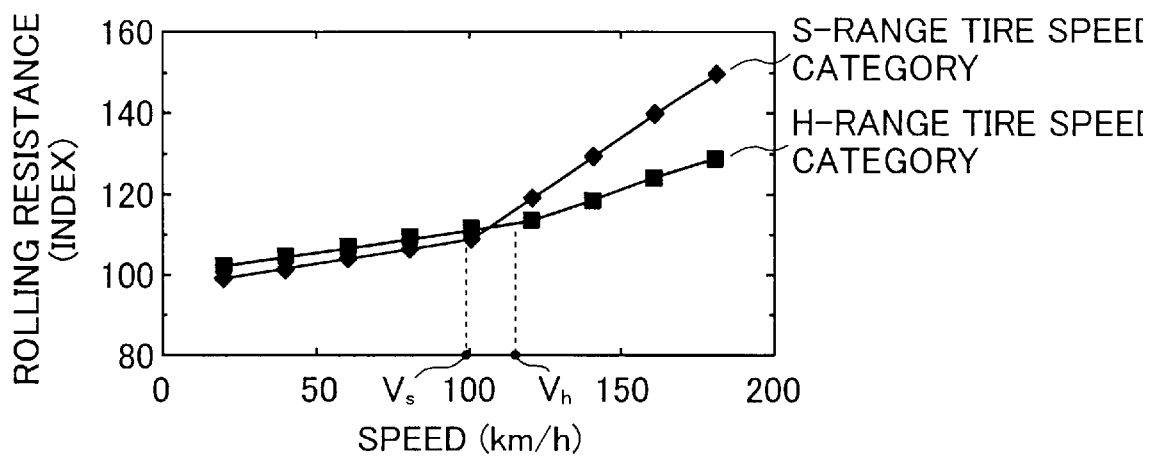
FIG. 4 is a diagram illustrating one example of a speed dependency of a tire rolling resistance value.

FIG. 4 illustrates the dependency of a rolling resistance value on the speed as measured using two 185/65R14-size passenger vehicle tires (tires in S-range and H-range tire speed categories). The tire inflation pressure is 200 kPa. According to this, it is understood that each of characteristic functions showing the speed dependencies of the rolling resistance values of the S-range tire and the H-range tire is expressed with a function composed of substantially two straight lines. Here, in contrast to the S-range tire, the H-range tire has a belt construction having one additional reinforcing layer composed of organic fiber applied on the circumference of the tire belt layer, to suppress outward expansion of the tire due to the centrifugal force generated when the tire rotates at high speed. Therefore, in the H-range tire, the speed dependency of the rolling resistance value is small, and in FIG. 4, the difference between the rolling resistance value and the rolling resistance value of the S-range tire increases above 100 km/hour or more. Furthermore, when comparing the speeds at which the rolling resistance values start to rise dramatically, a speed $V_h$ for the H range is relatively greater than a speed $V_s$ for the S range, as shown in FIG. 4. Therefore, it is assumed that there is a lower level of danger of the tire failure occurrence in the H-range tire than in the S-range tire. Actually, the probability of the failure occurrence while running at the high speed is found to be lower in the H-range tire than in the S-range tire.

Figure 5:
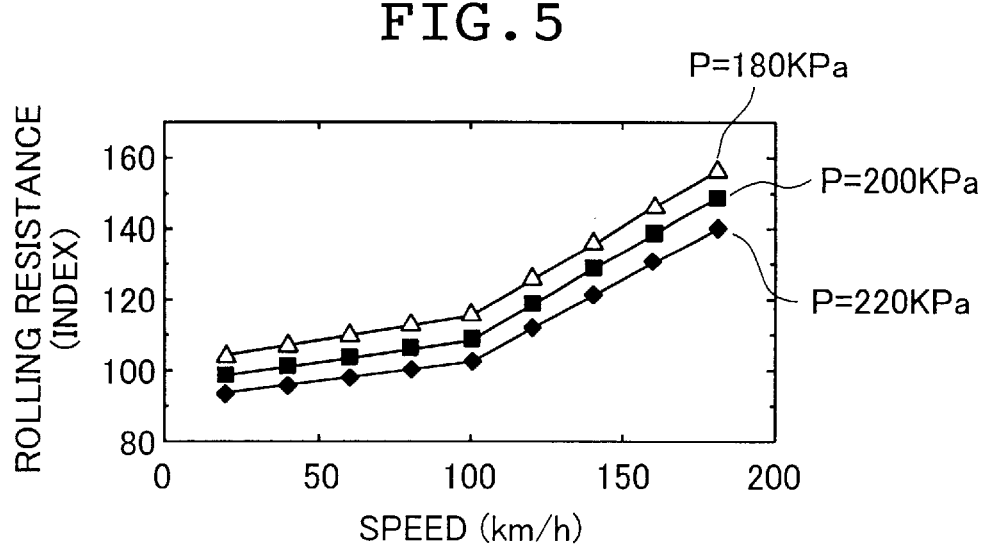
FIG. 5 is a diagram illustrating another example of a speed dependency of a tire rolling resistance value.

Further, FIG. 5 shows a change in the speed dependency of the rolling resistance value with respect to the tire inflation pressure of the S-range tire shown in FIG. 4.

According to this, the lower the tire inflation pressure the greater the distortion acting on the member of the tire, and the rolling resistance also increases and the heat generation of the tire increases, such that it is assumed that the danger level of the occurrence of the tire failure rises. Actually, when the tire inflation pressure is reduced, the probability of the tire failure occurring when running at the high speed is found to increase. In this case as well, a characteristic function for showing the speed dependency of the rolling resistance value is indicated using a function composed of substantially two straight lines.

As described above, in the present invention, the danger level assessing function F is a function of a similar type to the characteristic function of the rolling resistance value's speed dependency. That is to say that the level of danger of the failure occurring in the mounted tire can be estimated and assessed by means of a function composed of substantially two straight lines.

For example, in the case of the S-range tire shown in FIG. 4, the speed $V_s$ is considered as the reference speed $V_c$, the linear function $L_1$ can be represented by a linear function approximate to the function in a speed range that is equal to or below the speed $V_s$ of the rolling resistance shown in FIG. 4 multiplied $\gamma_1$ times. The linear function $L_2$ can be represented by a linear function approximate to the function in a speed range above the speed $V_s$ of the rolling resistance shown in FIG. 4 multiplied $\gamma_2$ times. Values of the scaling factors $\gamma_1$ and $\gamma_2$ are set by obtaining information about the actual tire failure occurrence probability through the indoor drum experiment and the like, or based on the values set as the danger level assessment values $W_1$ to $W_n$ that will be described below.

In a case where the scaling factors $\gamma_1$ and $\gamma_2$ differ from each other, the two linear functions in the reference speed $V_c$ do not connect with each other. Therefore, in order that the two linear functions to connect with each other smoothly near the reference speed $V_c$, the scaling factors $\gamma_1$ and $\gamma_2$ may be adjusted in the neighborhood of the reference speed $V_c$. Further, it is also acceptable if the two linear functions do not connect to each other.

As described above, in the present invention, the characteristic function of the tire's rolling resistance value is represented in an approximate fashion by the two straight or curved functions connected at the reference speed $V_c$, and the function obtained by multiplying these straight or curved functions by the scaling factors is set as the danger level assessing function F. At this time, the scaling factors by which the straight or the curved functions are multiplied are changed in the speed range above the reference speed $V_c$ and in the speed range that is equal to or below the reference speed $V_c$. The functions must be ones in which, in the speed range above the reference speed $V_c$, the value simply increases as the tire running speed V increases and increases as the air pressure P decreases. In this case, it is preferable that the value of the scaling factor $\gamma_2$ used in the speed range above the reference speed $V_c$ is equivalent to the value of the scaling factor $\gamma_1$ used in the speed range that is equal to or below the reference speed $V_c$, or that it is greater than the scaling factor $\gamma_1$.

Note that the reference speed $V_c$ should be set uniquely according to the type of the tire, the tire size, the air pressure to be set, and also according to a speed determined by a standard based on the tire's speed category.

As described above, the W-value calculating section 18a uses the danger level assessing function F which is a function of the air pressure P and the tire running speed V, to calculate the function assessment value $W_0$ from the monitored air pressure P and the monitored tire running speed V.

Further, the W-value calculating section 18a calculates a tire load ratio based on the tire load L monitored by and sent to from the tire load measuring device 16, and adjusts the calculated function assessment value $W_0$ according to this tire load ratio.

Here, the tire load ratio refers to a ratio of the tire load L obtained from the monitoring. The ratio is relative to a 100% load, which is determined according to the tire size and the tire inflation pressure to be set in the table of standards according to one of the Japan Automobile Tire Association standard (JATMA Year Book), the Tire and Rim Association standard (TRA Year Book) and the European Tyre and Rim Technical Organisation standard (ETRTO Standards Manual). The W-value calculating section 18a divides this tire load ratio by a standard load ratio which is obtained from the load provided to the mounted tire under a standard condition and from the 100% load under the standard condition, to thereby obtain the ratio indicated in the load ratio. Then, the ratio indicated in the load ratio is used as a coefficient by which the function assessment value $W_0$ is multiplied to perform adjusting. Alternatively, the adjustment is performed by multiplying the function assessment value $W_0$ by a coefficient which is calculated from the ratio indicated in the load ratio by using a given function. It is preferable to provide the above-mentioned adjustment to the function assessment value $W_0$ in order to make a precise assessment of the level of danger of the tire failure occurring. However, in a simpler and easier device construction, the tire load measuring device 16 is not provided, and the function assessment value $W_0$ calculated based on the air pressure P and the tire running speed V may be used without performing the adjustment.

The function assessment value $W_0$ obtained as described above is then sent to the W-value integrating section 18b.

Note that, in the memory 18e connected to the W-value calculating section 18a, there are set various functions for defining the danger level assessing function F and a variety of parameters for setting the danger level assessing function F from these functions, including the reference speed $V_c$, the sensitivity coefficients $\alpha$ and $\beta$, or the $W_b$ value and the like, according to a variety of conditions such as the tire type, the tire size and the tire inflation pressure to be set, and also according to the speed category of the tire and the like. The operator provides an instruction indicating the tire type, the tire size, the tire inflation pressure to be set and the like via input device that is not shown in the diagram, various parameters for uniquely setting the danger level assessing function F are called up, and thus the danger level assessing function F is set by the W-value calculating section 18a.

The W-value integrating section 18b is a part which adds a cumulative value $W_a$, which is determined according to the tire's history of use, to the function assessment value $W_0$ that is adjusted and sent from the W-value calculating section 18a so as to calculate the danger level assessment value W.

Figure 6:
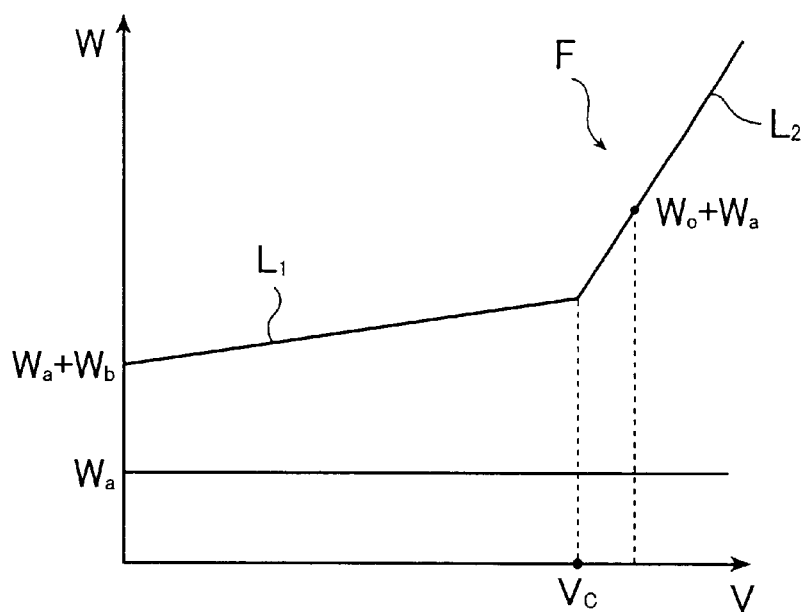
FIG. 6 is a diagram for explaining one example of calculation of a danger level assessment value used in the system according to the present invention.

In other words, the danger level assessment value W is a value that is calculated by adding the cumulative value $W_a$ to the function assessment value $W_0$ that was obtained using the danger level assessing function F as shown in FIG. 6.

Figure 7:
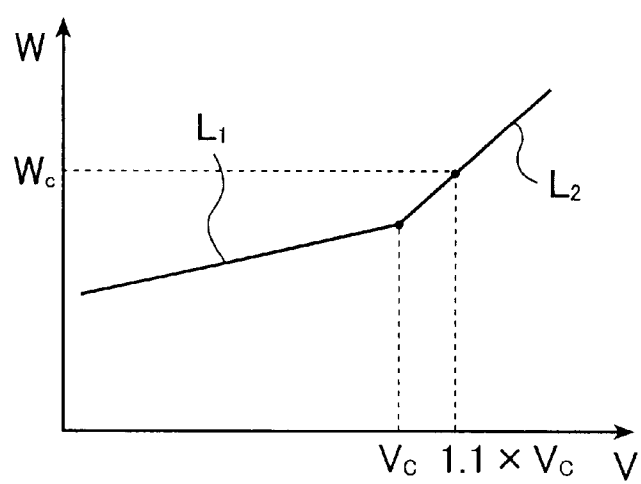
FIG. 7 is a diagram for explaining other example of a calculation of a danger level assessment value used in the system according to the present invention.

Here, to obtain the cumulative value $W_a$, cumulative values $W_{a1}$ and $W_{a2}$ (described below) are obtained based on a function assessment reference value $W_c$ (see FIG. 7) of the danger level assessing function F at a tire running speed that is determined by multiplying the reference speed $V_c$ by a given value greater than one, such as the tire running speed obtained by multiplying the reference speed $V_c$ by 1.1. Then, the cumulative value $W_a$ is obtained from the cumulative values $W_{a1}$ and $W_{a2}$ by using weighted coefficients $C_1$ and $C_2$ which are set as follows.

$$W_a = C_1 \cdot W_{a1} + C_2 \cdot W_{a2}$$

Here, the cumulative value $W_{a1}$ is determined as follows.

$$W_{a1} = H_1 \cdot Y \cdot W_c$$

Note that Y is a duration of tire usage years, as counted from the time when a new tire was mounted to the vehicle. For example, the Y value is substituted for 1.50 years (1 year and 6 months) or other such value having first and second decimal places. To obtain the Y value, the duration of tire use is counted by means of the timer 18f, which is set when the tire to be mounted is mounted to the vehicle.

The cumulative value $W_{a1}$ is obtained by multiplying a product of the function assessment reference value $W_c$ and the duration of tire usage years Y by the coefficient $H_1$. Both the value $W_c$ and the duration of tire usage years are provided as corresponding with a part of the cause of the natural deterioration of the mounted tire with the lapse of the tire usage years, and the occurrence of the tire failure while running. The reason why the function assessment reference value $W_c$ is used is to determine the extent of the mounted tire's natural deterioration, and thus the function assessment reference value $W_c$ is set using a given value greater than 1. Note that when using, for example, the function assessment reference value $W_c$, which is the assessment value at the tire running speed at 1.1 times the reference speed $V_c$, it is preferable to set the coefficient $H_1$ within a range of 0.05~1.0 (per year).

On the other hand, the cumulative value $W_{a2}$ is determined as follows.

$$W_{a2} = H_2 \cdot X \cdot W_c$$

Here, X is related to a sum of the function assessment values $W_0$s calculated in the past. Specifically, as shown in the following equation, X is obtained by summing up the product of the function assessment value $W_0$ that is assessed at every time interval t (time) and the time interval t from the time when the mounted tire usage starts.

$$X = \Sigma(W_0 \cdot t)$$

Further, for example, when using the function assessment reference value $W_c$, which is the assessment value at the tire running speed of 1.1 times the reference speed $V_c$, it is preferable to set the coefficient $H_2$ within a range of 0.0005 to 0.02 (per hour).

Note that, the coefficients $H_1$ and $H_2$ and the weighted coefficients $C_1$ and $C_2$ are stored in the memory 18e in advance, and are called up by the W-value integrating section 18b, to be used to obtain the above-mentioned cumulative value $W_a$.

Note that, in accordance with the present embodiment, the cumulative value $W_a$ is calculated using the weighted average of the cumulative values $W_{a1}$ and $W_{a2}$; however, it is also possible to use one of the cumulative values $W_{a1}$ and $W_{a2}$ as the cumulative value $W_a$.

The cumulative value $W_a$ obtained as described above according to the tire's usage history is added to the function assessment value $W_0$ at the W-value integrating section 18b to calculate the danger level assessment value W. The calculated danger level assessment value W is sent to the notification level determining section 18c.

The notification level determining section 18c is a part which assesses the danger level into several levels based on the danger level assessment value W sent from the W-value integrating section 18b. For example, the notification level determining section 18c is provided with the following areas according to how high or low the danger level assessment value is: a normal area in which the probability of the tire failure occurring is low and indicating a normal running status; an attention rousing area indicating that the probability of the tire failure occurring becomes relatively high; a tire running speed deceleration warning area in which the probability of the tire failure occurring has become further higher and in which it is desirable to reduce the tire running speed; and a stop warning area in which the probability of the tire failure occurring has become extremely high and it is required to stop the movement immediately. The notification level determining section 18c determines which area the danger level assessment value W sent from the W-value integrating section 18b is included in, and assesses the level as indicating the normal status, the attention rousing status, the deceleration warning status, the stop warning status, or the like.

Danger level assessment values $W_1$ to $W_n$ (n is the number of areas which are set) which define the areas described above are stored in the memory 18e in advance, and are called up by the notification level determining section 18c.

Information indicating the result of the assessment determined regarding the danger level of the occurrence of the tire failure is sent to the signal generating section 18d.

The signal generating section 18d is a section which generates a notification level signal to be sent to the notification device 20 and the automatic vehicle control device 22, based on the information indicating the result of the assessment of the danger level of the mounted tire failure occurring.

Notification level signals are stored in the memory 18e in advance, and the signal generating section 18d calls up one of the notification level signals based on the assessment result information sent from the notification level determining section 18c and generates the signal.

The generated notification level signal is sent to the notification device 20 and the automatic vehicle control device 22.

The danger level assessment device 18 is constructed as described above.

In accordance with the above-mentioned system for notifying a driver of the level of danger of the occurrence of tire failure 10, the air pressure P, the tire running speed V and the tire load L, which are sent at given time intervals from the tire inflation pressure measuring device 12, the tire running speed measuring device 14 and the tire load measuring device 16, are used by the W-value calculating section 18a to calculate and adjust the function assessment value $W_0$ based on the set danger level assessing function F, and the W-value integrating section 18b adds the cumulative value $W_a$ to the function assessment value $W_0$ to calculate the danger level assessment value W. Further, based on the calculated danger level assessment value W, the notification level determining section 18c assesses the danger level of the occurrence of the failure of the mounted tire.

The notification level signal is generated based on the assessment result, and is sent to the notification device 20 and the automatic vehicle control device 22.

Thus, the notification device 20 outputs an alarm to the driver of the vehicle to which the tire is mounted, using a voice output device, or visually displays the danger level of the tire failure occurring on a display or the like which is provided on the vehicle.

Further, the automatic vehicle control device 22 automatically controls the running speed of the vehicle to which the tire is mounted based on the result of the assessment, which is, for example, the deceleration warning status or the stop warning status.

It is obvious that the system for notifying a person of the level of danger of the occurrence of tire failure according to the present invention is not limited to the embodiment and explanation written above, and various improvements and changes may be made without altering the gist of the present invention.

As explained above, even in the case where the tire mounted to the vehicle is used under the tire usage condition, in which various tire usage conditions are overlapped, it is still possible to notify the driver of the level of the danger of the tire failure occurring before the tire failure occurs.

What is claimed is:

1. A system for assessing a level of danger of an occurrence of failure of a mounted tire to a vehicle, and notifying a person of the level of the danger according to a result of the assessment, the system comprising:

a tire inflation pressure measuring device for monitoring a tire inflation pressure of the mounted tire;

a tire running speed measuring device for monitoring a tire running speed of the mounted tire;

a danger level assessment device for, at least in a case where the tire running speed obtained by the monitoring is higher than a given reference speed, calculating a danger level assessment value indicating an index showing a probability of the occurrence of the failure of the mounted tire from the tire inflation pressure obtained by the monitoring by the tire inflation pressure measuring device and from the tire running speed obtained by the monitoring by the tire running speed measuring device, based on a danger level assessing function, and assessing the danger level of the occurrence of the tire failure of the mounted tire from the danger level assessment value; and a notification device for notifying a person of the danger level of the occurrence of the failure of the mounted tire, according to a result of the assessment of the danger level, wherein the danger level assessing function is a function of the tire running speed and of the tire inflation pressure, in which, at least when the tire running speed is in a speed range above the given reference speed, a value of the function monotonically increases as the tire running speed increases, and the value of the function increases as the tire inflation pressure decreases.

2. The system according to claim 1, wherein the danger level assessing function has a first linear function defined in a speed range equal to or below the reference speed in which a value of the function remains fixed regardless of increase in the tire running speed, or increases linearly with the tire running speed, and a second linear function defined in a speed range above the reference speed in which a value of the function increases linearly with the tire running speed; and wherein the first linear function and the second linear function connect at the reference speed and a gradient of the second linear function with respect to the tire running speed is greater than a gradient of the first linear function with respect to the tire running speed.

3. The system according to claim 2, wherein the gradient of the first linear function and the gradient of the second linear function are determined by the tire inflation pressure.

4. The system according to claim 3, wherein the gradient of the first linear function is equal to or above 0, and is equal to or less than 0.02 times a calculated value produced from the first linear function at a tire running speed 0 under a condition of a tire inflation pressure to be set of the mounted tire; and the gradient of the second linear function is greater than 0.02 times, and equal to or less than 1.0 times, the calculated value produced from the first linear function at the tire running speed 0 under the condition.

5. The system according to claim 1, wherein the danger level assessment device adds a cumulative value determined according to a usage history of the mounted tire to a calculated value from the danger level assessing function, whereby the danger level assessment value is calculated.

6. The system according to claim 5, wherein the danger level assessment device multiplies a duration of time for which the mounted tire is used by a function assessment reference value calculated from the danger level assessing function at a tire running speed that is produced by multiplying the reference speed by the given value greater than 1, whereby the cumulative value is obtained.

7. The system according to claim 5, wherein the danger level assessment device multiplies a sum of calculated values in a past for the mounted tire from the danger level assessing function by a function assessment reference value calculated from the danger level assessing function at a tire running speed that is produced by multiplying the reference speed by the given value greater than 1, whereby the cumulative value is obtained.

8. The system according to claim 5, wherein the danger level assessment device calculates a weighted average between: a value produced by multiplying a product of a duration of time for which the mounted tire is used and a function assessment reference value calculated from the danger level assessing function at a tire running speed that is produced by multiplying the reference speed by a given value greater than 1, by a given number of times; and a value produced by multiplying a product of a sum of calculated values in a past for the mounted tire from the danger level assessing function and the function assessment reference value by a given number of times, whereby the cumulative value is obtained.

9. The system according to claim 1, wherein the danger level assessing function with respect to the tire running speed when the tire inflation pressure is at a fixed level is a function obtained by approximating a characteristic function of a rolling resistance value that indicates a dependency of the mounted tire's rolling resistance on the tire running speed using two straight-line or curved-line functions which are connected to each other at the reference speed, and multiplying each of these straight-line or curved-line functions by a given coefficient; and a value of the coefficient used in the speed range above the reference speed is a value equivalent to or greater than a value of the coefficient used in the speed range that is equal to or below the reference speed.

10. The system according to claim 1, wherein sensitivity coefficients which indicate gradients of the danger level assessing function with respect to the tire running speed, and which include a first sensitivity coefficient for the speed range equal to or below the reference speed and a second sensitivity coefficient for the speed range above the reference speed, decrease linearly as the tire inflation pressure increases.

11. The system according to claim 1, further comprising a load measuring device for monitoring a tire load while the vehicle runs, wherein the danger level assessment device calculates a tire load ratio based on a load obtained from the load measuring device by the monitoring, and adjusts a calculated value produced from the danger level assessing function based on the tire load ratio.

* * * * *